UNITED STATES PATENT OFFICE.

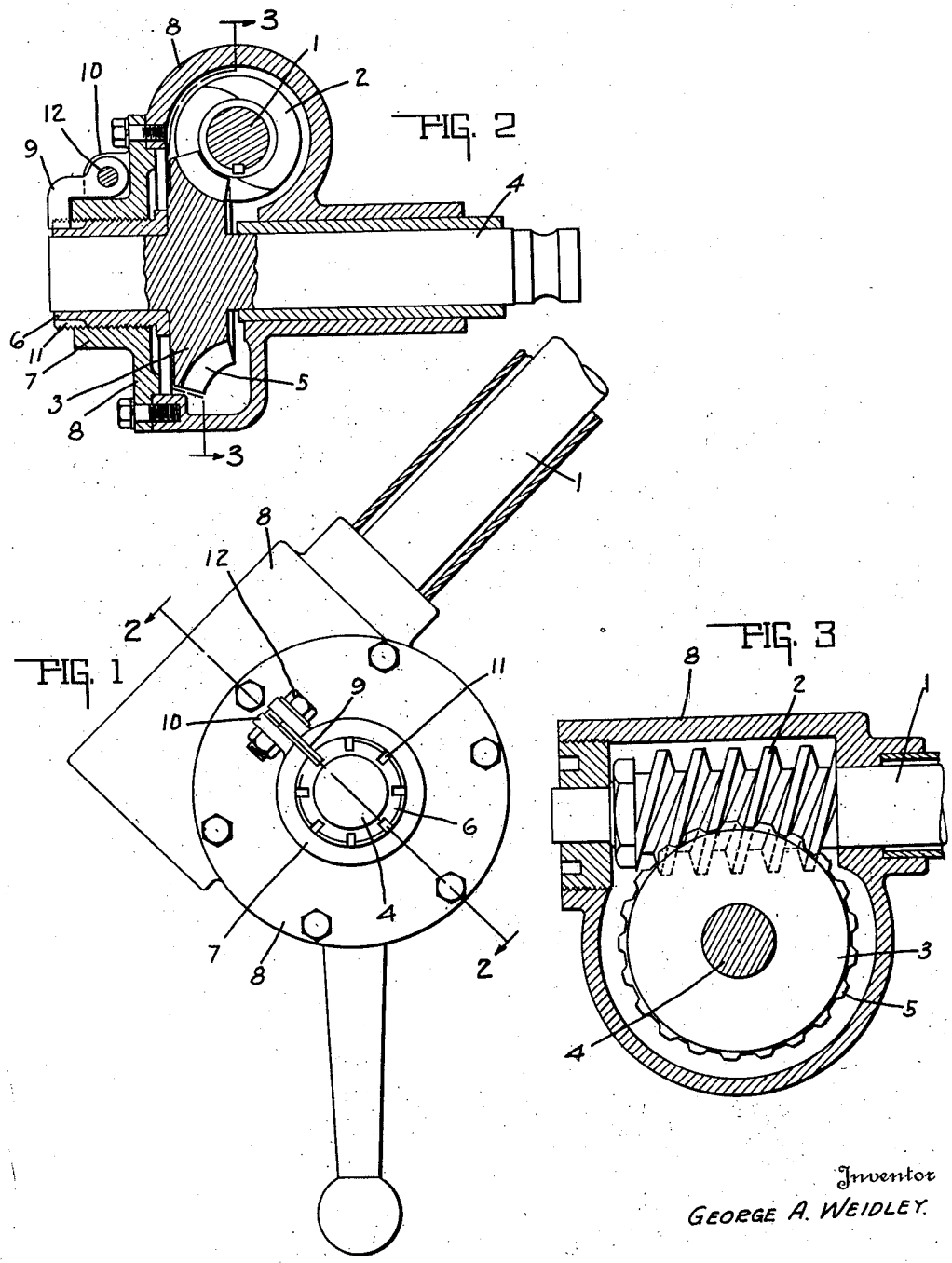

GEORGE A. WEIDELY, OF INDIANAPOLIS, INDIANA.

ADJUSTABLE WORM DRIVE.

1,407,904.    Specification of Letters Patent.    Patented Feb. 28, 1922.

Application filed June 11, 1921. Serial No. 476,820.

*To all whom it may concern:*

Be it known that I, GEORGE A. WEIDELY, a citizen of the United States, residing at Indianapolis, in the county of Marion and State of Indiana, have invented certain new and useful Improvements in Adjustable Worm Drives, of which the following is a specification.

This invention relates to worm gear construction, and the prime feature of the invention is in so constructing the gear that it may be positioned laterally of the axis of the worm and at direct right angles to the worm whereby the same radius will be maintained at all times between the teeth of the gear and worm at whatever adjustment the gear may be given towards the worm, consequently the wear between the parts of the gear and worm will be uniform at every point and the take-up between the two gears will likewise be uniform.

A further feature of the invention is in so constructing and mounting the gear with respect to the worm that the radial center of the teeth of the gear will be maintained with the radius of the teeth of the worm as the gear is adjusted inwardly from time to time towards the worm to take up any wear that may occur between these parts.

A further feature of the invention is the construction of means for easily and quickly adjusting the gear towards or from the worm.

A further feature of the invention is the provision of means for holding the adjusting means for the gear in fixed position.

Other objects and advantages will be hereinafter more fully set forth and pointed out in the accompanying specification.

In the accompanying drawings,

Figure 1 is an elevation of a portion of a steering column as used in connection with motor propelled vehicles with my improved mechanism applied thereto, Figure 2 is a sectional view thereof as seen on line 2—2, Figure 1, and Figure 3 is a sectional view as seen on line 3—3, Figure 2, said section being at right angles to the section shown in Figure 2.

Referring to the drawings, 1 indicates a steering post which may be of any preferred type to which is secured a worm 2, said worm being of the conventional or any preferred type.

In former devices of this class it has been customary to place the gear co-operating with the worm in such position that a line drawn through the center of the gear transversely of its axis would intersect the axial center of the worm, and with the teeth so arranged upon the gear as to form the radial axis of the teeth at the transverse center of the gear. In constructions of this class it is necessary to throw the gear off center with the shaft upon which it is mounted in order to adjust it towards the worm, and after considerable wear the teeth of the gear would become out of radial alignment with the radius of the teeth of the worm, consequently causing lost motion.

To overcome these objectionable features the gear 3 carried by a stub shaft 4 is of such a diameter as to extend a distance above the lower peripheral edge of the worm 2, and while the gear 3 is directly at right angles to the worm 2 it rests substantially at a tangent to the axis of the worm, consequently the teeth 5 on the gear 3 are arranged in one edge of the periphery of the gear and rest at an angle to the longitudinal axis of the gear and are cut substantially on the same arc as the arc of the teeth on the worm. By arranging the gear 3 and the teeth 5 in this manner the gear may be moved bodily towards the worm and in a straight line with the axis of the shaft 4 to take up any wear or play that may result from usage, and as the top edges of the teeth 5 at their lowermost points are substantially in alignment with the innermost edges of the teeth of the worm a very minute adjustment of the gear may be accomplished, and a continued adjustment may be had until the utility of the gear or worm is entirely destroyed.

Any suitable means may be employed for adjusting the gear 3 towards the worm 2, but in the present instance a sleeve 6 is introduced around one end of the shaft 4, and is exteriorly threaded for engagement with an interiorly threaded collar of a housing 8, said housing surrounding the gear and worm and being formed in sections and bolted together so that the worm and gear may be readily assembled. After the sleeve has been rotated to properly adjust the gear 3 it may be locked in its adjusted position through the medium of a latch 9 which is pivoted between ears 10 on parts of the housing 8, the free end of the latch engaging notches 11 in the periphery of the sleeve 6.

A clamping bolt 12 forms the pivot for the latch 9 and also clamps the ears 10 together to hold the latch 9 against casual swinging movement. The notches 11 will also serve to receive any suitable form of tool, such as a spanner wrench for rotating the sleeve 6 for adjusting purposes.

With this form of device, intermittent adjustments may be given the gear 3 for taking up any wear or lost play until the gears are entirely worn out, while with the ordinary worm gear construction only a certain degree of adjustment may be had as the adjusting power is limited, consequently in the present construction a great saving in cost of replacement is accomplished and likewise a great saving of time and expense in making adjustments by employing the simple form of adjusting mechanism, as shown.

In addition to the above advantages the gear is always maintained in the same relative alignment with respect to the worm, consequently the operation of the worm and gear mechanism will be perfect throughout the life or use of the mechanism.

It will likewise be understood that although the worm and gear are shown as used in connection with a steering mechanism for motor propelled vehicles, it will be equally applicable for other uses, and without necessitating the rearranging or changing of any of the parts.

Having thus fully described my said invention, what I claim as new and desire to secure by Letters Patent, is:

1. A worm gear construction comprising a worm, a gear co-operating therewith, and means for adjusting the gear laterally to the axial trend of the worm for taking up wear thereon.

2. A worm gear construction comprising a worm, a gear for co-operation with said worm, said gear being positioned at right angles to and laterally of the axial center of the worm, and means for adjusting said gear towards the worm without changing the axial position of the gear or worm.

3. A worm gear construction comprising a worm, a gear for co-operation with said worm, teeth on said gear arranged at an angle to the axis of the gear and curved from end to end at a radius corresponding to the radius of the worm, and means for moving said gear transversely to the axis of the worm for adjusting the gear with respect to the worm.

4. In a worm gear construction, a shaft upon which said worm is mounted, a second shaft at right angles to the worm carrying shaft, a gear mounted on the second shaft and adapted to partially overlap the worm, teeth in one edge face of said gear at the same radius as the teeth of the worm, and means for moving said gear transversely of the path of the worm for adjusting the gear with respect to the worm.

5. In a worm gear construction, a worm, a gear co-operating with said worm, a shaft carrying said gear, a sleeve mounted on said shaft adapted to adjust the gear towards the worm when rotated, and means for causing the sleeve to move towards the gear when rotated in one direction.

6. In a worm gear construction, a worm, a gear co-operating with said worm, a shaft carrying said gear, a sleeve mounted on said shaft adapted to adjust the gear towards the worm when rotated, means for causing the sleeve to move towards the gear when rotated in one direction, and means for locking the sleeve in its adjusted position.

In witness whereof, I have hereunto set my hand and seal at Indianapolis, Indiana, this 8th day of June, A. D. nineteen hundred and twenty-one.

GEORGE A. WEIDELY. [L. S.]

Witnesses:
ROBERT F. MILLER,
CAREY S. FRYE.